Sept. 26, 1961 W. L. HYDE 3,001,450
REAR VISION OPTICAL SYSTEM
Filed March 27, 1959 4 Sheets-Sheet 1

INVENTOR
WALTER LEWIS HYDE
BY Louis L. Gagnon
Nobly S. Williams
ATTORNEYS

Sept. 26, 1961 W. L. HYDE 3,001,450
REAR VISION OPTICAL SYSTEM
Filed March 27, 1959 4 Sheets-Sheet 2

INVENTOR
WALTER LEWIS HYDE
ATTORNEYS

INVENTOR
WALTER LEWIS HYDE

Sept. 26, 1961 W. L. HYDE 3,001,450
REAR VISION OPTICAL SYSTEM
Filed March 27, 1959 4 Sheets-Sheet 4

INVENTOR
WALTER LEWIS HYDE
ATTORNEYS

United States Patent Office 3,001,450
Patented Sept. 26, 1961

3,001,450
REAR VISION OPTICAL SYSTEM
Walter Lewis Hyde, East Woodstock, Conn., assignor to American Optical Company, Southbridge, Mass.
Filed Mar. 27, 1959, Ser. No. 802,332
8 Claims. (Cl. 88—86)

This invention relates to improvements in rear-vision optical systems constructed and arranged for use in automobiles, trucks, airplanes, and the like, and is a continuation-in-part of application Serial No. 687,014 filed September 30, 1957. More particularly, the invention relates to optical systems for such purposes constructed and arranged to provide a relatively large, unobstructed, and realistic appearing rear field of view for the driver or other occupants of the vehicle.

The ordinary centrally located rear-view mirror within a conventional automobile at the present time does not provide as good a field of view to the rear of the vehicle as might be desired. At best, it provides a restricted field of view which is very much limited both in the lateral and the vertical directions thereof. Merely increasing the dimensions of this mirror, furthermore, will not satisfactorily increase the field of view for the driver, for example, since the field will still be limited or obstructed by the size of the rear window of the vehicle through which the driver must look while using the mirror. Not only is the driver's rear field of view restricted, but another condition which is of great importance is the fact that in such an arrangement "blind areas," at opposite sides of this restricted field of view, in a conventional rear-view mirror arrangement exist so that cars, for example, following closely behind the driver's car may actually be near but still completely concealed from view by a passenger in the center of the seat, or by rear corner portions of the car. Such conditions, of course, at times create very dangerous driving conditions. For instance, the second car may actually be close and about to pass the driver's car without the driver being aware of the condition, even though he may glance into his rear-view mirror before starting to slow down, turn, or even pull out of line to pass cars ahead of his own car.

Door-post mounted mirrors have additionally been employed in order to give drivers a more complete view of the road to the rear. However, even though such a mirror may supplement the centrally mounted mirror, in that it would also give a view rearwardly along one side of the vehicle, nevertheless, it would be considerably spaced from the centrally located mirror and, accordingly, it would be necessary to look alternately in different directions when attempting to observe all road conditions by the use of these mirrors. Thus, even though together a somewhat improved driving condition might be obtained, nevertheless, two such mirrors jointly are not entirely satisfactory.

In certain instances, both centrally mounted mirrors or door-post mounted mirrors, have been slightly convexly curved in order to increase somewhat their lateral fields of view but such has not been entirely satisfactory since while a wider field of view has been obtained, nevertheless, the resulting images have been reduced in size and appreciably distorted with the result that the drivers of vehicles so equipped could not immediately determine by glancing into the mirror just how far away, for example, vehicles and other objects in his rear-vision mirror actually were.

Improved rear-view optical systems of the present invention, on the other hand, are of such construction and arrangement that not only is a large realistic appearing rear field of view provided the driver (or other user of the system), but also the system is of such improved construction and design that no structural parts of the vehicle or occupants within the vehicle will normally interfere in any way with the view being obtained by the driver, or other occupant, for which this system is intended. Furthermore, the construction and arrangement of parts are such that the entire field of view can be seen as a mirror-like image in true or normal size and proportions, as if same were being provided by a conventional plane rear-view mirror, (or when desired, the system can be modified slightly to give a magnified or diminished image). In addition, the view is binocular and stereoscopic perception of depth is preserved.

Furthermore, the improved optical system is of such a character that only a few relatively inexpensive plane or cylindrically curved optical parts or elements are required and these can be incorporated into an automobile or vehicle design easily and economically. Additionally, when the improved optical system is provided in a vehicle and is to be used by different users thereof, only a very slight and easily effected adjustment of an optical part will be needed to satisfy the different requirements of the users.

A rear-view or rear-vision optical system made in accordance with the teachings of the present invention provides a relatively wide field of view, when considered both in the horizontal and the vertical directions thereof, may be in substantially true proportions and in normal size or may be slightly anamorphic either in a vertical direction or in a horizontal direction, when desired, even though its optical parts considered in the vertical direction thereof act much like an astronomical telescope system in focusing substantially parallel light rays from the object field at a focal plane in said system and thereafter directing these rays as parallel rays toward an eye point or position in said system. However, considered in the horizontal direction thereof, the system is much like an ordinary rear-view mirror in that no reversal of image takes place and, accordingly, different parts of the object field appear to the driver (or user) of the system, to come from the direction from which he or she would normally expect same to come. Thus, the true proportions and proper arrangement of parts of the object field so observed will give to the driver the feeling that he or she is actually observing the view itself.

It is accordingly an object of the present invention to provide an improved and efficient rear-view or rear-vision optical system comprising a relatively small number of plane and cylindrically curved mirrors and components which may be easily and economically made and incorporated into a vehicle, truck, or the like, and which system will provide a relatively large field of view for the driver (or occupant) of the vehicle, and which field of view will appear properly oriented and substantially free from distortion and in substantially true dimensions or somewhat enlarged or reduced, as desired, depending upon the requirements of different installations.

It is also an object to provide a rear-view optical system for a vehicle or the like which comprises an elongated cylindrically curved positive objective lens and an elongated cylindrically curved positive eye mirror optically aligned and spaced from each other a distance substantially equal to the sum of their respective focal lengths so as to form a telescopic arrangement having a common primary focal point therebetween, as well as a plane mirror in the system so as to invert the light rays passing through said system, and which system is so disposed in an automobile or other vehicle that the relatively large realistically appearing field of view provided thereby will be normally in no way obstructed by occupants within said vehicle.

It is another object of the present invention to provide an optical system of the above character in a vehicle or the like which will provide the relatively large and realistic view mentioned above and which system in the vehicle is of such a construction and arrangement that it will in no way interfere with the usual duties of a driver operating the vehicle.

It is also an object of the invention to provide in such a rear-view optical system an elongated positive cylindrical or plano-cylindrical field lens at or near the primary focus of the objective lens of the system in such a manner that said system will cover a larger vertical field without requiring increases in the sizes of other optical parts of the system, will serve as convenient means for obtaining a desired operative distance between the eye mirror of the system and the eye position of the driver or user of the system, will give a sharper outline to the object field, will provide greater tolerances in manufacture and assembly, and will serve as an adjustable control during assembly for the amount of anamorphism to be provided by the system.

It is an additional object of the invention to provide for an optical system of the character described means whereby same may be readily adjusted to the individual requirements of different persons using same; as well as conveniently located means for controlling the character and intensity of the image being viewed by the system.

Other objects and advantages of the invention will become apparent from the detailed description which follows when taken in conjunction with the accompanying drawings, in which.

Figure 1:
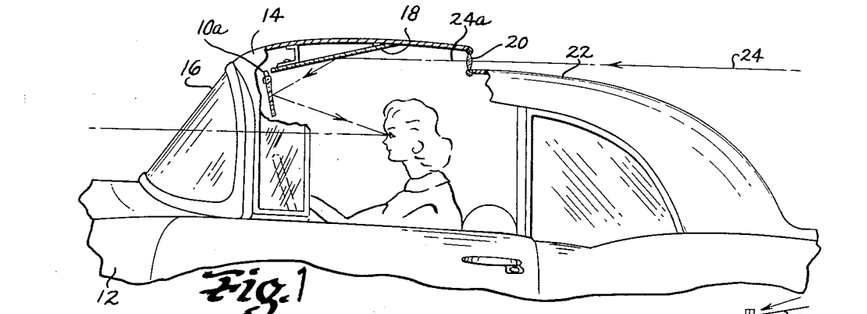
FIG. 1 is a side elevational view of a vehicle embodying an optical system of the present invention, parts of said vehicle being broken away to better show the details of construction of said system.

Referring to FIG. 1 in detail, it will be seen that an improved rear-view or rear-vision optical system embodying the present invention is shown and comprises a concavely cylindrically curved mirror 10 mounted in an automobile 12 near a forward roof portion 14 thereof and adjacent the upper edge of a windshield 16, so that the driver of the vehicle by glancing upwardly and forwardly may look into this mirror. In optical alignment with cylindrically curved mirror 10 is a relatively large plane mirror 18 which is carried in a nearly horizontal position adjacent the roof portion 14 of the vehicle, and somewhat rearwardly of this plane mirror 18 is disposed a cylindrically shaped convergent lens 20. Lens 20 is, in fact, shown positioned between the rear edges of the front roof portion 14 and a rear roof portion 22 and these two roof portions are arranged in such stepped relation to each other that a substantially horizontal portion 24a of an optical axis 24 extending through lens 20 is located above rear roof portion 22 and below forward roof portion 14.

Figure 2:
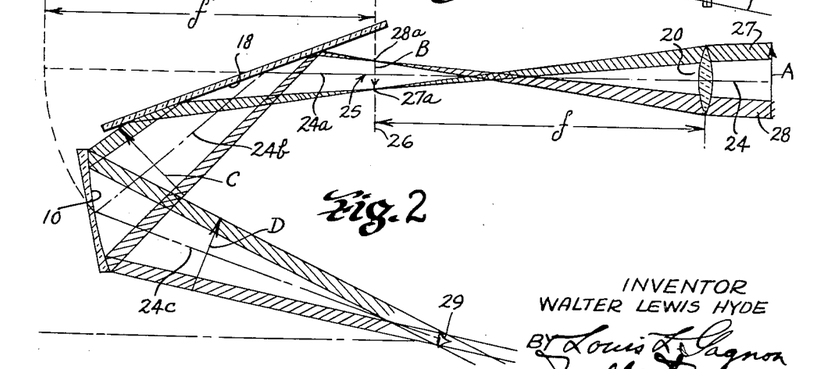
FIG. 2 is a sketch on a somewhat enlarged scale showing essential components of an optical system embodying the invention and showing the paths of certain light rays thereof for a better understanding of the invention.

If reference is also made to FIG. 2 wherein the parts 10, 18 and 20 are shown in a vertical sectional view and somewhat enlarged, it will be seen that the cylindrical lens 20 which may be termed an objective is so disposed that substantially parallel light rays from an object field to the rear of the vehicle will pass through the lens 20 in entering the interior of the vehicle and will be brought to a focus by this positive lens 20 substantially at a principal focal plane 26 indicated at a focal distance $f$ forwardly of the lens 20. It follows, therefore, that light rays parallel to the axis 24 will be brought to a focus at the principal focus or axial point 25 while parallel light rays from the upper part of the object field (as indicated at 27) will be focused below the axis at focal point 27a. Also parallel light rays from the lower part of the object field (as indicated by rays 28) will be focused above the axis at focal point 28a.

It will be clear from this figure that plane mirror 18 is of such size and so located in the optical system that it will intercept light rays transmitted by the cylindrical objective lens 20 and reflect same generally downwardly and forwardly toward the concave cylindrical mirror 10. Cylindrical mirror 10 is purposely made of such a predetermined concave curvature that its focal length $f'$ will be substantially equal to $f$ (the focal length of lens 20) and is disposed substantially at this distance from the focal plane 26 as measured along portions 24a and 24b of the optical axis 24.

It will be appreciated from this figure of the drawing that light rays passing through the lens 20 and focused substantially at the plane 26 will be, as indicated by the arrows A and B, inverted. On the other hand, since the cylindrical mirror 10 is disposed substantially at its focal distance from the image plane 26, and since plane mirror 18 is disposed in a sloping position in the path of the rays as they pass forwardly of the focal plane 26 these rays will be not only directed downwardly and forwardly to impinge upon the cylindrical mirror 10 but also will be inverted as indicated by the arrow C. These rays impinging upon mirror 10 so located will be reflected thereby as substantially parallel rays in a downwardly and rearwardly direction along an extension 24c of the optical axis toward an eye position 29 of the driver (or occupant) seated in the vehicle so as to use the rear-vision system, and thus the image which will be observed will appear in an upright position as indicated by the arrow D.

When the curvature of the cylindrical lens 20 and cylindrical mirror 10 are such as to provide in these two optical elements substantially equal focal lengths ($f=f'$) a substantially unit power optical system or telescope, considered in the vertical direction thereof will be produced. Not only will the image-forming rays provide a visual image in which persons and objects will appear to be of normal size and upright but also, since elements 10 and 20 are positive cylindrical elements with their axes of generation extending generally laterally, said upright object in the object field will appear in proper lateral arrangement the same as in a conventional rear-view mirror, as will be presently more fully explained.

In the preceding paragraphs, the behavior of the light rays from the object field and travelling in a vertical plane including the optical axis 24 has been mainly discussed. If reference is now made to FIG. 3 wherein a plan view of this optical system is indicated, it will be seen that the cylindrical lens 20 is of considerable length and has its major meridian, which may be termed its axial meridian, extending in a transverse direction with reference to axis 24 and this axis extends more or less in the direction of travel of the vehicle 12. Also, note that the plane mirror 18 is of appreciable width or transverse dimension and that the cylindrical mirror 10 is likewise of considerable transverse length and has its axial meridian thus disposed transversely and in parallel relation to that of lens 20. However, as will presently appear, the mirror 10 does not need to be of as great a transverse dimension as is required for lens 20.

It will be readily apparent from the light rays shown in this figure (for example, rays 34a and 34b) that no change in direction occurs as they pass through and beyond lens 20. In other words, lens 20 as considered in FIG. 3 has no power and thus functions merely the same as an ordinary window in admitting the rays to the interior of the vehicle. Also note that cylindrical mirror 10 has no power when considered in this same manner and thus functions merely as an ordinary mirror in reflecting the light incident thereon. Therefore, it will be recognized that the eyes 29a and 29b of the driver, for example, in the position indicated may be directed forwardly toward mirror 10 and when directed toward one side of the cylindrical mirror 10 and then the other side, he will be able to binocularly see all parts of a relatively wide object field included between light rays 34a, 34b on the right and light rays 36a, 36b on the left. And as stated above, the objects will look real and upright. His line of sight, as considered in FIG. 3, will merely be redirected back in "plane-mirror fashion" by mirror 10 toward plane mirror 18 and then toward the cylindrical lens 20 without any reversal of image taking place therein, notwithstanding the fact that at the same time, as shown in FIG. 2, there is an inverting of image produced by lens 20 and a second inverting of image produced by the plane mirror 18. Thus, while it might be considered that the optical system, as viewed in FIG. 2 in a vertical section, constitutes a unit power telescope supplemented by the image inverting element 18, nevertheless, since only cylindrical and plane elements are used, this system when considered in horizontal section, as in FIG. 3, involves no image enlarging or reducing, nor image inverting, or reversing. Thus, a very material difference exists between the present improved system and systems of former constructions wherein both spherical elements or components were used. (It is here specifically noted that if a positive spherical lens and a positive spherical mirror were used in place of lens 20 and mirror 10 respectively of the present improved system, such would not provide the results desired.)

Figure 3:
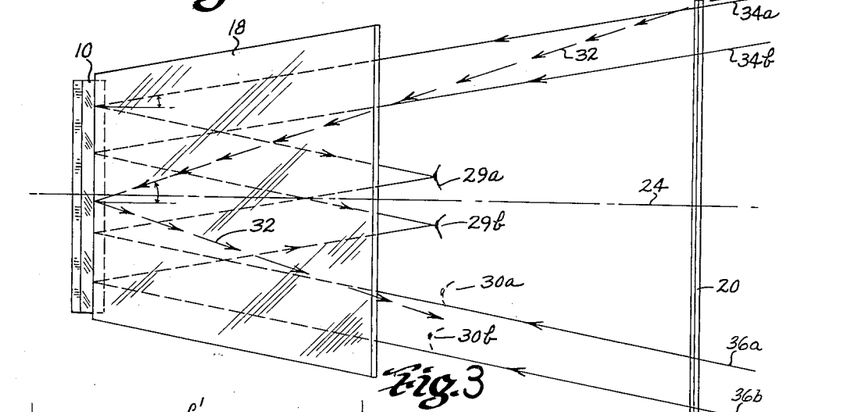
FIG. 3 is a diagrammatic plan view of an optical system like that of FIG. 2 and indicating the direction of certain light rays passing therethrough.

As may be gathered from the preceding description, the extent of the instantaneous field of view which may be obtained in a horizontal direction by a system of the type shown in FIGS. 1–3 is mainly limited by the transverse dimensions of the optical components which may be conveniently employed within an enclosing vehicle. In the system here shown as much as a 12° field may be obtained. However, as indicated by the dotted line eye positions 30a, 30b, it should be appreciated that when special occasions require, the driver (or occupant) of the vehicle may obtain an extra wide lateral field of view to the rear of the vehicle by simply leaning to one side or the other of the center vertical plane of the system. This is indicated by a line of arrows 32. Thus, in the system of FIGS. 1–3, a total effective field of view obtained rearwardly of the vehicle by bobbing of the driver's head to one side and then the other could be as much as 28 degrees. Since the light passing through this system from an object field to the rear of the vehicle is outside the vehicle at all points rearwardly of the cylindrical lens 20 and is near the roof section 14 until it reaches the mirror 18, no rear part of the top of the vehicle or no occupants in the front or rear seats of the vehicle will obstruct this view.

Figure 8:
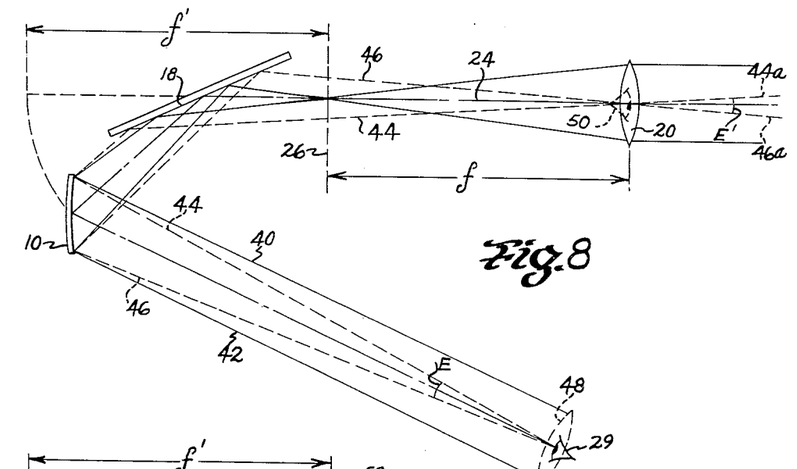
FIG. 8 is a sketch somewhat like FIG. 2 but differently showing light rays traveling therethrough.

The extent of the object field of view, considered in the vertical direction, may not be immediately appreciated from inspection of FIGS. 1 and 2 of the drawing. However, FIG. 8 shows that from the eye position 29, which is, in fact, located at the exit pupil of the system, the driver may see a fair size vertical field even though the objective 20 is appreciably axially spaced from his eyes, and also even though the objective 20 does not appear to be large in its vertical dimension. The reason why such a good viewing condition is obtained is due to the fact that each eye of the driver will be, in effect, transposed from position 29 to the location of the objective lens 20, with the result that the view which he or she will observe will appear as if the eyes were actually disposed at the location of lens 20, the view being limited only by the vertical angular size E of mirror 10 (the field stop of the system) as seen from point 29.

In FIG. 8, it will be noted that the eye 29 is in the beam of substantially parallel light included between rays 40 and 42 reflected by mirror 10. This light, it should be appreciated, was substantially parallel light from a distant object field before it entered the optical system through lens 20. Also since lens 20 and mirror 10 were optically spaced apart an amount equal to the sum of their focal lengths, when considered in vertical section, this light will be focused by lens 20 at focal plane 26 and, after inversion by mirror 18, will be rendered substantially parallel by concave mirror 10. Even though the driver's eyes at the exit pupil (a distance equal to $2f$ from the eye mirror 10) will be disposed a considerably greater distance from the objective lens 20, when measured along the optical axis, nevertheless, the driver will not feel as if he or she is looking through a long passageway whose far end is merely the size of the opening in the roof accommodating lens 20. On the contrary, since lens 20 and mirror 10 are both positive cylindrical elements and are optically spaced from the focal plane 26 an amount equal to the sum of their focal lengths, the eye at 29 will be so spaced from mirror 10 that its conjugate image will be, as indicated by dotted lines 44 and 46, located substantially at the plane of lens 20. Or stated differently, the entrance pupil of the system will lie at the plane of the objective 20 and the size of the exit pupil at the driver's eyes will be equal to the full height of the image of the objective formed by mirror 10, and indicated by dotted lines 48. Likewise, the driver's eye will be imaged by mirror 10 at the plane of the objective lens 20, as indicated by dotted line 50.

An advantageous result thus obtained is the fact that should the driver raise or lower his head, a small amount, out of the exit pupil bounded by the limiting rays 40 and 42, his eyes will be completely out of line with the light rays from the object field directed by mirror 10 toward the eye position 29. Accordingly, at night, for example, the bright lights of an auto following the driver's car closely may be easily completely avoided, if desired. Appreciable adjustment of the system for different driver's requirements may be easily obtained by merely pivoting the mirror 10 vertically a sufficient amount about the horizontal axis of pivot means 10a (FIG. 1). Another distinct advantage which is obtained is the fact that a larger vertical angular field of view (indicated by E′ between dotted line light rays 44a and 46a from the extreme edges of the object field) is obtained than would be possible by the use of a conventional plane rear-view mirror forwardly of the driver and positioned for sighting through a plane glass window in place of lens 20. From FIG. 8, it will be clear that light rays of greater vertical angular value than E′ will not pass through the system since they would not impinge upon cylindrical mirror 10 even if plane mirror 18 were large enough to accept them.

Figures 4, 7:
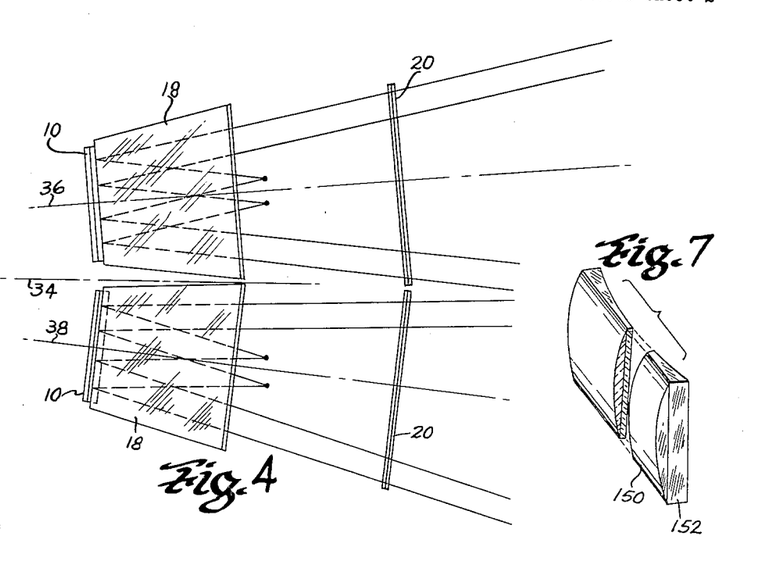
FIG. 4 is a plan view of a modified form of the invention and showing a pair of optical systems somewhat like that shown in FIGS. 1 and 3, but one system arranged for use by the driver and the other by an adjacent passenger.
FIG. 7 is a perspective view of a modified optical component which may be employed in a rear-view system embodying the present invention.

In FIG. 4, there is indicated at 34 the approximate center line of the vehicle while at 36 and 38 the optical axis of a pair of optical systems basically like the system already described are shown in side-by-side relation and these two systems are indicated in slightly angled relation to the center line 34. A dual arrangement of this type may be easily arranged to provide not only a rear view for the driver of a vehicle but also a rear view for an occupant riding in a seat beside the driver. An additional advantage to be obtained by such an arrangement, insofar as the driver is concerned, is the fact that he may obtain a more complete view to the left rear of his vehicle by this slightly angled arrangement and, accordingly, may have a better opportunity to observe other following vehicles at a near location and as they start to pass. In such a dual arrangement, it will also be possible to position both systems in parallel relation to the vehicle center line 34, if desired. In either case, it would be possible to tilt the cylindrical mirrors 10 about their respective horizontal pivotal axes to accommodate the requirements of different drivers and different occupants of the vehicle.

Figure 5:
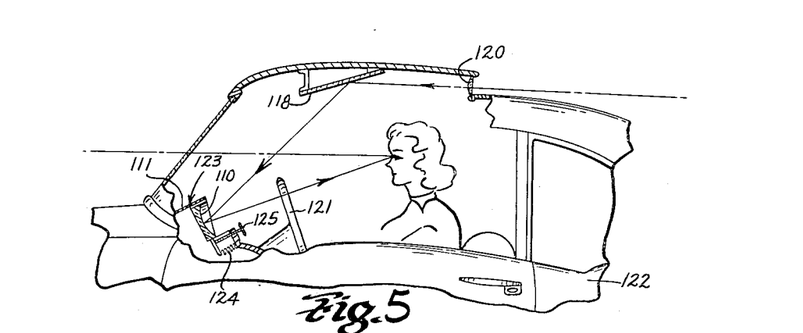
FIG. 5 is a side elevational view somewhat like that in FIG. 1 but showing a modified form of the invention.

In FIG. 5 is shown a rear-view optical system somewhat like that of FIG. 1 but in this figure a cylindrical curved mirror 110 is disposed preferably in the dash 111 of a vehicle directly or nearly directly forwardly of the driver and this mirror is arranged to direct the driver's line of sight upwardly towards a plane mirror 118 after which it passes rearwardly and outwardly of the vehicle by way of a cylindrical lens 120. Even though portions of a steering wheel 121 of the vehicle 122 in such an arrangement might seem to be so located as to obstruct a part or parts of the field of view being observed, it has been found in actual use of a vehicle equipped with a system of this type that by very slight movement of the driver's head in an up-and-down or sidewise direction or both, he or she may very easily and almost instantaneously obtain a complete view of all parts of the object field. A distinct advantage obtained by this modified system over that provided by the construction of FIG. 1 resides in the fact that since the light rays incident upon mirror 118 have smaller angles of incidence and reflection, the required mirror area for reflecting and inverting the entire light beam between lens 120 and mirror 110 may be made appreciably smaller. In order to allow the mirror 110 to be adjusted for use by different persons, horizontal hinge means is provided at 123, and to work therewith is a tensioning spring 124 arranged to pull upwardly on the lower edge of the mirror 110 and a thumb screw 125 arranged to press downwardly on a lower part of the mirror. Thus, various angular positions for the mirror 110 can be readily obtained.

Figure 6:
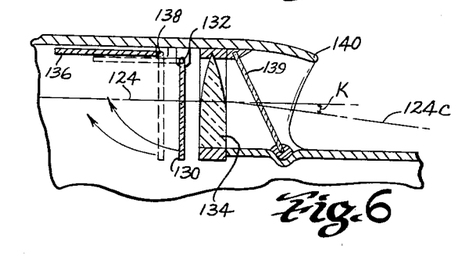
FIG. 6 is an enlarged fragmentary sectional view showing certain optical parts in detail.

In FIG. 6 is shown a laterally elongated light filter 130 pivotally hinged by friction hinge means 132 adjacent the roof of the vehicle and immediately ahead of an objective 134. The purpose of this filter is to reduce, when desired, the brightness or shade of the light being allowed to pass through the optical system. Forwardly of filter 130 is an opaque or translucent screen 136 and this screen is likewise pivotally hinged as by friction hinge means 138 to the roof of the vehicle. Obviously, such a filter and screen can be used immediately ahead of the objective in any of the modified constructions described herein, and thus would be located nearly directly above the head of the person using the associated system. Accordingly, when occasions arise requiring a change in the amount of light being received, it will be an easy and convenient matter for the user to pivot one or both up or down as he or she wishes.

Also shown in FIG. 6 is a cylindrical objective lens 134 of slightly modified form. While this lens 134 functions like lenses 20 and 120 in vertically converging the light rays transmitted thereby, nevertheless, since lens 134 may be considered as if formed by two elongated cylindrically curved lenses materially spaced relative to each other at their lower edges by a solid wedge of refracting medium therebetween, lens 134 will also act in like manner upon all rays transmitted thereby in refracting same downwardly somewhat. Thus, it might be said that that part 124c of the optical axis 124 outwardly of the vehicle is tipped or bent downwardly as indicated by the angle K. Not only will the prismatic effect of this arrangement be such as to allow a view of the road nearer the rear of the vehicle but also this downward bending of the principal rays of the beam may allow a smoother fitting and blending of optical components of the system into roof portions of the car. Of course, a plano-cylindrically curved lens could likewise be formed in effect with a wedge portion so as to bend the axis downwardly. Outwardly of the lens 10, 120, or 134, if desired, a plane sloping window 139 may be used for ease in keeping the exposed outer surface of lens 134 clean and protected, and a sun shield over this window can easily be provided by merely extending somewhat the rear edge 140 of the upper forward roof portion.

While the focal length $f$ for the cylindrical objective lens (20, 120 or 134) and the focal length $f'$ for the cylindrical mirror (10 or 110) intended to function therewith have been taken as equal to each other so that a unit power optical system will be produced, it is possible to use in a single system such a lens and mirror which do not have equal focal values. Nevertheless, when they are assembled in a system, they would be optically spaced from each other a distance equal to the sum of their focal lengths and under such conditions a vertical elongation or vertical foreshortening of image would be observed through the system. Even though this would actually amount to an image distortion, probably no more than a 30 percent increase or decrease in the vertical dimension of the image would ever be desired in any system.

In FIG. 1, a positive objective lens having two elongated cylindrical curved surfaces is shown and in FIG. 5 an elongated positive objective lens of a plano-cylindrical type is shown. Both of these lenses are convergent lenses, considered in vertical section, and will perform in much the same manner in the optical systems already described. In FIGS. 7, however, a modified objective lens construction is shown wherein an elongated positive plano-cylindrical lens element 150, like that at 20 in FIG. 5, is shown and upon its rear face may be cemented or otherwise secured or formed a negative cylindrical refracting surface 152 having its axial meridian vertically dsposed. Thus, it can be said that the axial meridians of these two cylindrical lenses 150 and 152 are disposed in planes at right angles to each other.

One purpose for such an additional negative lens element as element 152 (or negative surface if formed directly upon the objective lens in any of the optical systems already described) is to provide a somewhat wider object field of coverage for the driver of the vehicle even though the apparent size of objects in the horizontal direction of the field would be reduced somewhat. When such a negative lens is made a part of the optical system, it would generally be advisable to modify the focal length ($f$) of the objective lens 20 and the focal length ($f'$) of the concave mirror 10 so that $f=0.7f'$ or $0.8f'$, and again separate them by approximately the sum of the focal lengths. The effect of this changed focal power of the elements will be a 20 to 30 percent reduction in image size in the vertical dimensions of objects. Thus, together these two reductions (vertical and horizontal) will produce an image which will not be distorted although it will appear to be from 70 to 80 percent of normal size. Probably a reduction in image sizes of as much as 20 to 30 percent can be tolerated without having the driver of the vehicle experience difficulty in judging distance between his vehicle and others to the rear. A de-magnifying cylindrical telescope system of this type will demand a slight accommodation (about 0.3 diopters) of the eyes of the driver for best focus in the horizontal meridian, and to avoid astigmatism, the objective and cylindrical mirror should be separated by a distance slightly less than the sum of their focal lengths.

Not only will the width of the object field which can be covered by such a modified system using this negative lens element be increased, it will also be possible to use an objective lens of smaller vertical dimension without reducing the exit pupil, or alternatively, it will provide an increase in exit pupil size provided by the objective considered in the vertical direction thereof and accordingly, will give a little greater freedom of vertical movement for the eyes of the user at position 29. The height of the exit pupil, $h_{ep}$, is related to the height of the objective $h_o$, by the formula $h_{ep}=h_o/M$ where M is the magnification.

It may be desirable at times to provide a greater height for the object field to be viewed through the system or, stated differently, desirable to be able to locate the exit pupil of the system closer to the eye mirror thereof, and this may be accomplished by the use of a positive cylindrically curved field lens 52 of proper power transversely disposed in the system at or very near the common focal plane 54 of positive cylindrical eye mirror 56 and positive cylindrical objective lens 58. Field lens 52, as shown, has a focal length substantially equal to the focal length of the objective 58 with the result that the eye position 60 at the exit pupil of the system will be moved toward mirror 56 so as to be a distance $f$ therefrom. However, the height of the exit pupil in this case of a unit power system will be unchanged; it will be exactly equal to the height of the objective lens 58. If a positive field lens of a lesser power were used at the focal plane 54, the eye position would be moved a lesser amount toward the mirror 56. (It follows, of course, that should it ever be desired to move the eye position a little further away from the mirror 56 than that shown in FIG. 8, a negative cylindrical field lens may be used at the common focal plane instead of the positive one.) In the showing in FIG. 9 not only is the eye position moved forward into the position desired for the driver, but also an additional advantage is gained from the standpoint of manufacturing efficiency in having the focal length of this lens 52 the same as that of the objective 58.

Figure 9:
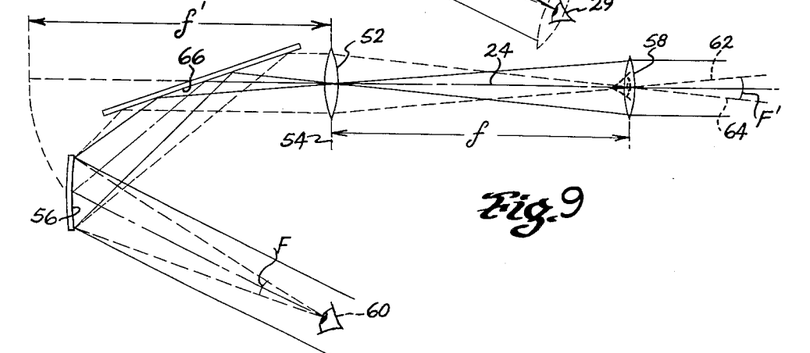
FIG. 9 is a sketch somewhat like FIG. 8 but additionally showing a field lens in the optical system thereof.

This field lens 52 will provide additional desirable features besides those mentioned above. It will give to the driver of the vehicle, for instance, a sharper outline and crisper cut-off to his field of view. This condition makes the system more easily adaptable to the requirements of various vehicles and it can be axially adjusted more freely during assembly to control the vertical magnification of the system. Also the field lens renders the system less critical to slight errors of misalignment of the optical components thereof and allows greater manufacturing tolerances.

Since the field lens 52 is located at the focal plane 54 and has a focal length equal to the focal length of the objective lens 58, the image of the distant object field formed by the objective lens at focal plane 54 will be unchanged in position and size but field lens 52 will allow a larger vertical field F' to be covered. This is evident when light rays 62 and 64 from the extreme upper and lower edges of the object field are considered. These extreme rays will pass through objective 58 without deviation but will be deviated and rendered substantially parallel by field lens 52 in the region beyond lens 52. Of course, these rays will be reflected downwardly and forwardly by plane mirror 66 so as to impinge upon cylindrical eye mirror 56, and because of the positive power of mirror 56, they will converge toward the eye position 60. The angular value F of the vertical field of view seen from eye position 60 is likewise limited by the height of eye mirror 56 acting as the aperture stop of the system and, of course, F and F' are equal. In this modification, likewise, the driver's eye will be, in effect, re-imaged at the plane of the objective 58. Furthermore, since the dotted line rays 62 and 64 at the top and bottom edges of field lens 52 in FIG. 9 are deviated inwardly by this lens sufficiently to pass through the system (a thing they would not do if lens 52 were omitted), it is clear that the angular object field indicated at F' between these rays will be greater than the angular value indicated at E' in FIG. 8.

If a control of anamorphism is desired, field lens 52 might be at times moved axially a small amount one way or the other during assembly in the vehicle depending upon whether an increase or decrease in image height is desired. As much as a 20% change in the vertical dimension of the image might be effected by this adjustment without seriously affecting the accommodation of the driver.

Figure 10:
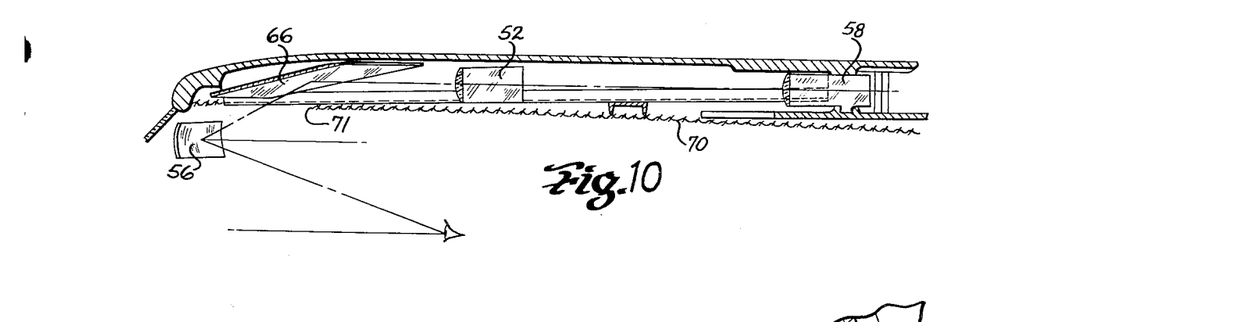
FIG. 10 is a longitudinal vertical sectional view taken upon section line 10—10 of FIG. 11 and looking in the direction of the arrows and showing a rear-view optical system similar to that shown in FIG. 9 but installed in an automobile roof.
Figure 11:
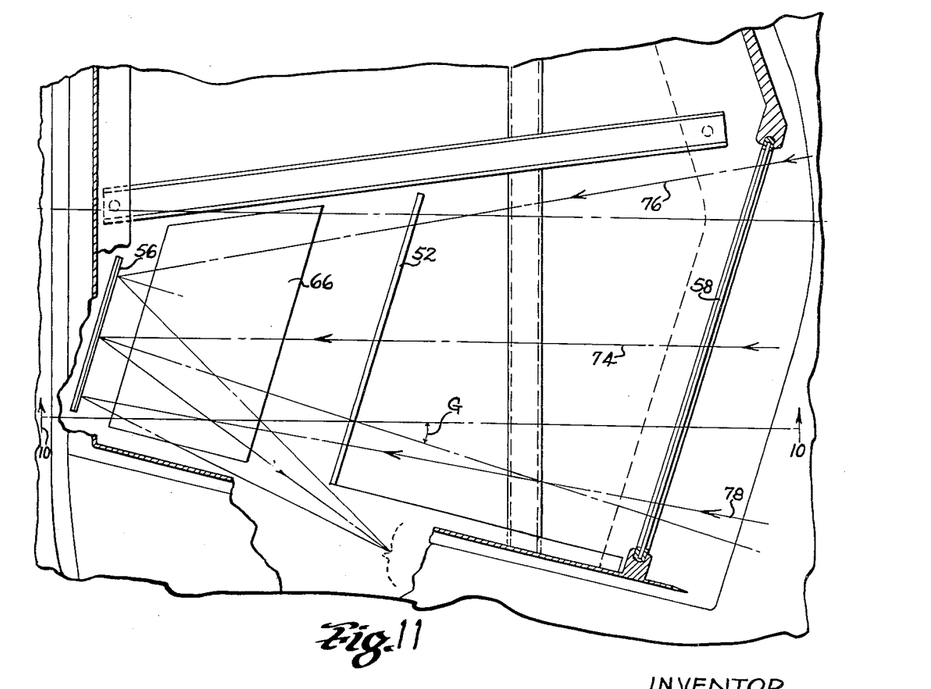
FIG. 11 is a fragmentary plan view of an automobile, certain parts thereof being broken away to show the optical system of FIG. 9 incorporated therein.

In FIGS. 10 and 11 are shown vertical and horizontal sectional views respectively of a rear-view optical system layout as installed within the roof construction of an automobile. FIG. 10 indicates how the system would be mostly concealed from view from within the vehicle. The installation, as viewed from above in FIG. 11 shows at G how this optical system is angled at approximately 18° relative to section 10—10 which has been taken parallel to the center line of the vehicle. It will be clear from dot-dash lines 74 and 76 of this figure that the driver will not only have a view directly to the rear of his vehicle and even somewhat to the right, but also will have an even greater view to the left rear of his vehicle, as indicated at 78, particularly from that area occupied by trailing vehicles as they start to overtake and pass the driver's car. The interior fabric 70 extends forwardly along the roof of the car to a point 71 partially overlapping the plane mirror 66. Lenses 52 and 58, however, will be completely concealed from view from within the vehicle.

Figure 12:
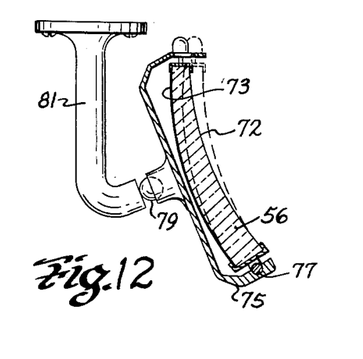
FIG. 12 is a modified form of eye mirror which can be used in the optical system of the present invention.

In such an optical system as disclosed in FIGS. 10 and 11, it may be desirable to be able to control the character and intensity of the reflected light from eye mirror 56 rather than by a screen and visor, as indicated at 130 and 136 in FIG. 6. Accordingly, in FIG. 12, there is shown a construction in which both the front and back surfaces of an elongated piece of transparent glass or plastic are cylindrically curved to like radii but about different centers of generation so as to have, in effect, a wedge condition therein. That is, the lower edge of the eye mirror is slightly thicker than the upper edge. Also the back surface 73 will be coated so as to have approximately fifty percent reflectivity and then coated on back and sides with a black paint. This mirror may then be mounted in an open box-like supporting frame 75 so as to be tiltable about its lower hinge means 77 between a forward (dotted line) position and a rearward (solid line) position. Thus, the light to be reflected and converged by the eye mirror may be reflected toward the eye position by the front surface 72 or by the back surface 73 as desired and in accordance with the degree of intensity of light desired therefrom; the front giving about a 5% reflectance and the back about a 50% reflectance. Hinge means 79 carried by a bracket 81 supported on the roof of the vehicle allows the mirror to be adjusted when desired to requirements of individual drivers.

While a negative cylindrical lens 152 has been shown in FIG. 7 applied to the rear face of the objective lens 150 for widening out the effective horizontal field of view of the system, it should also be noted that an equivalent negative lens preferably of relatively weak power could similarly be used next to the field lens 52 in FIG. 11, if desired, for widening out the horizontal field of view thereof.

Actual installations of such a rear-view optical system have been made and used satisfactorily. Such an installation comprised a plano-cylindrical objective lens 2 inches high and 24 inches long and of a 212 mm. radius. It was positioned 18 inches axially from a field lens of like dimensions except that the length of the field lens was 17 inches. A plane image-inverting mirror, of trapezoidal shape and having its opposite parallel sides spaced 8½ inches part and 12 and 15¾ inches long, respectively, was positioned an axial distance of 9 inches from this field lens 52. Downwardly at an offset angle of 13 degrees and forwardly an axial distance of 6 inches from this plane mirror was positioned a rectangular eye mirror, and the eye mirror was 2¼ inches high, 8½ inches long and cylindrically curved on its front and back surfaces to 1055 mm. radii. A system of these dimensions provides a full horizontal field of approximately 24 degrees and a full vertical field of approximately 5.6 degrees.

While the optical systems of the present invention have been described particularly in connection with their use in an automobile, truck or similar vehicle, it will be readily appreciated that they may be used to advantage in other places and for other purposes wherein equivalent indirect wide realistic upright mirror-like views of objects to the rear of the user are desired.

Having described my invention, I claim:

1. A rear-view optical system in a vehicle or the like and adapted to provide an upright realistically appearing view of an object field to the rear of said vehicle, said system comprising first, second and third cylindrically curved positive optical components and a plane mirror disposed in said vehicle and adjacent a roof portion thereof so as to be in spaced optically aligned relation to each other along a common optical axis, said cylindrically curved components being of appreciable lengths in the directions of their axial meridians and having their respective axial meridians extending substantially horizontally and in transverse relation to said optical axis so as to be in substantially parallel relation to each other, said first and third components having substantially equal focal length and being axially spaced from each other a distance approximately equal to the sum of their respective focal lengths so as to have a common focal plane substantially midway therebetween and providing a substantially unit magnification for said system, said first component being a refracting component in the form of an objective lens positioned adjacent an opening in said roof portion so as to admit light rays from said object field into the interior of said vehicle and focus said light rays at said focal plane, whereby an inversion of said light rays without a side-for-side reversal thereof at said focal plane will be produced, said second component being a refracting component disposed in said system substantially at said common focal plane so as to function as a field lens in said system, said plane mirror being disposed in said system at a selected axial location intermediate said first and third components in such a manner as to produce a second inversion of said light rays travelling therebetween without a side-for-side reversal thereof, said third component being in the form of a cylindrically curved eye mirror positioned in said vehicle adjacent an upper edge of the windshield thereof so as to receive said light rays passing beyond said focal plane and inverted by said plane mirror and direct same downwardly and rearwardly as parallel light rays toward a conventional eye position for the driver of said vehicle, said second component having a predetermined focal length so related to the focal lengths of said first and third components as to conveniently locate the exit pupil of said system near said eye position.

2. A rear-view optical system in a vehicle or the like and adapted to provide an upright realistically appearing view of an object field to the rear of said vehicle, said system comprising first, second and third cylindrically curved positive optical components and a plane mirror disposed in said vehicle so as to be in spaced optically aligned relation to each other along a common optical axis, said cylindrically curved components being of appreciable lengths in the directions of their axial meridians and having their respective axial meridians extending substantially horizontally and in transverse relation to said optical axis so as to be in substantially parallel relation to each other, said first and third components being axially spaced from each other a distance approximately equal to the sum of their respective focal lengths so as to have a common focal plane located therebetween, said first component being a refracting component in the form of an objective lens positioned adjacent an opening in a roof portion of said vehicle so as to admit light rays from said object field into the interior of said vehicle and focus said light rays at said focal plane, whereby an inversion of said light rays without a side-for-side reversal thereof at said focal plane will be produced, said second component being a refracting component disposed in said system substantially at said common focal plane so as to function as a field lens in said system, said plane mirror being disposed in said system at a selected axial location intermediate said first and third components in such a manner as to produce a second inversion of said light rays travelling therebetween without a side-for-side reversal thereof, said second cylindrically curved component and said plane mirror being disposed adjacent said roof portion, and said third component being in the form of a cylindrically curved eye mirror positioned in said vehicle adjacent a lower edge of the windshield thereof and disposed so as to receive light rays passed beyond said focal plane and inverted by said plane mirror and direct same upwardly and rearwardly as parallel light rays toward the conventional eye position of the driver of said vehicle, said second component having a predetermined focal length so related to the focal lengths of said first and third components as to conveniently locate the exit pupil of said system near said eye position.

3. A rear-view optical system comprising first, second, and third cylindrically curved positive optical components and a plane mirror disposed in spaced optically aligned relation to each other along a common optical axis, said positive optical components each having appreciable length in the direction of their axial meridians, and having their respective axial meridians extending substantially horizontally and in a transverse direction relative to said optical axis so as to be in substantially parallel relation to each other, said first and second optical components being refracting optical components and said third component being a reflecting optical component, said first and third optical components being axially spaced from each other a distance approximately equal to the sum of their respective focal lengths so as to have a common focal plane therebetween, said first optical component being positioned in said system so as to receive light rays from an object field rearwardly of said system and direct same as convergent focused rays toward said focal plane, whereby an inversion of said light rays without a side-for-side reversal thereof at said focal plane will be produced, said second optical component having a focal length of predetermined value and being disposed in said system substantially at said focal plane so as to function as a field lens therein for increasing the effective height of the field of view which may be observed through said system, said plane mirror being disposed in said system at an axial location intermediate said first and third optical components in such a manner as to intercept said light rays and cause a second inversion of the light rays travelling through said system without a side-for-side reversal thereof, and said third optical component being positioned in said system so as to receive said light rays after passing beyond said second component and said plane mirror and direct same as substantially parallel rays toward a predetermined eye position in said system.

4. A rear-view optical system in a vehicle or the like and adapted to provide an upright realistically-appearing view of an object field to the rear of said vehicle, said system comprising first, second, and third cylindrically curved positive optical components and a plane mirror disposed in said vehicle in spaced optically aligned relation to each other along a common optical axis, said positive optical components having appreciable lengths in the directions of their axial meridians, and having their respective axial meridians extending substantially horizontally and in a transverse direction relative to said optical axis so as to be in substantially parallel relation to each other, said first and second optical components being refracting optical components and said third component being a reflecting optical component, said first and third optical components being axially spaced from each other a distance approximately equal to the sum of their respective focal lengths so as to have a common focal plane therebetween, said first optical component being positioned in an opening in a wall portion of said vehicle so as to receive light rays from an object field rearwardly of said vehicle and direct same as convergent focused rays toward said focal plane, whereby an inversion of said light rays without a side-for-side reversal thereof at said focal plane will be produced, said second optical component having a focal length of predetermined value and being disposed in said system substantially at said focal plane so as to function as a field lens therein for increasing the effective height of the field of view which may be observed through said system, said plane mirror being disposed in said system at an axial location intermediate said first and third optical components in such a manner as to intercept said light rays and cause a second inversion of the light rays travelling through said system without a side-for-side reversal thereof, and said third optical component being positioned in said system so as to receive said light rays after passing beyond said second component and said plane mirror and direct same as substantially parallel rays toward a predetermined eye position in said vehicle.

5. A rear-view optical system for use in a vehicle or the like for providing an upright realistically-appearing image at a predetermined eye position in said system, said system comprising a first elongated cylindrically curved positive refracting optical component, a second elongated cylindrically curved positive refracting optical component, a plane mirror and an elongated cylindrically curved positive reflecting optical component arranged in optical alignment with each other along a common optical axis, said positive refracting and reflecting optical components having their respective axial meridians extending substantially horizontally and in a transverse direction relative to said optical axis so as to be in substantially parallel relation to each other, each positive optical component having a predetermined focal length, said first refracting optical component and said cylindrically curved reflecting optical component being axially spaced from each other a distance approximately equal to the sum of their focal lengths, said first refracting component being arranged when disposed on said vehicle so as to receive light rays from an object field rearwardly of said vehicle and direct same as convergent focused rays toward a focal plane intermediate said first refracting and said reflecting optical components, whereby an inversion of said light rays without a side-for-side reversal thereof at said focal plane will be produced, said second refracting optical component being disposed in said system adjacent said focal plane and acting as a field lens therein, said plane mirror and said cylindrically curved reflecting component being so optically aligned and so angularly disposed in said system and relative to each other as to intercept the light rays transmitted by said first and second refracting components and provide a second inversion of said light rays without a side-for-side reversal thereof, one of said plane mirror and said reflecting component being the last optical member in said system and so angularly disposed therein as to direct said light rays rearwardly toward said predetermined eye position, and the other being located between said last member and said second refracting component, whereby a person using said system and looking toward said last optical member may observe from said eye position a wide substantially undistorted upright and normal appearing mirror-like virtual image of said object field.

6. The combination set forth in claim 5 in which said field lens has a focal length substantially equal to the focal length of said first optical component.

7. The combination set forth in claim 5 including a negative cylindrically curved lens of relatively weak power disposed adjacent said field lens with its axial meridian extending vertically for increasing by a preselected amount the effective field of view of said system in the horizontal direction thereof.

8. The combination set forth in claim 5 in which the reflecting optical component is formed of a transparent material and has a pair of cylindrically curved surfaces formed on the front and rear faces thereof, said pair of surfaces being in slightly vertically angled relation to each other, a reflecting coating deposited upon the said rear surface, said component being readily movable between two different operative positions of adjustment for locating either said front surface or said rear surface in an operative position in the rear-view optical system so as to reflect the light rays passing therethrough toward the eye position of said system.

References Cited in the file of this patent

UNITED STATES PATENTS

| | | |
|---|---|---|
| 1,616,279 | Parodi | Feb. 1, 1927 |
| 2,017,634 | Newcomer | Oct. 15, 1935 |
| 2,121,815 | Morrison | June 28, 1938 |
| 2,135,262 | Schumacher | Nov. 1, 1938 |
| 2,221,449 | Hoeninghausen | Nov. 12, 1940 |
| 2,430,549 | Altman | Nov. 11, 1947 |
| 2,579,903 | Carbonara | Dec. 25, 1951 |
| 2,719,457 | Tripp | Oct. 4, 1955 |

FOREIGN PATENTS

| | | |
|---|---|---|
| 843,059 | Germany | July 3, 1952 |
| 856,724 | Germany | Nov. 24, 1952 |
| 863,717 | Germany | Jan. 19, 1953 |
| 936,074 | Germany | Dec. 1, 1955 |